United States Patent
Cui et al.

(10) Patent No.: US 8,433,566 B2
(45) Date of Patent: Apr. 30, 2013

(54) METHOD AND SYSTEM FOR ANNOTATING VIDEO MATERIAL

(75) Inventors: Zhan Cui, Colchester (GB); Nader Azarmi, Colchester (GB); Gery M Ducatel, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 883 days.

(21) Appl. No.: 12/526,726

(22) PCT Filed: Feb. 7, 2008

(86) PCT No.: PCT/GB2008/000443
§ 371 (c)(1),
(2), (4) Date: Aug. 11, 2009

(87) PCT Pub. No.: WO2008/099141
PCT Pub. Date: Aug. 21, 2008

(65) Prior Publication Data
US 2010/0039564 A1 Feb. 18, 2010

(30) Foreign Application Priority Data
Feb. 13, 2007 (EP) .................................. 07250573

(51) Int. Cl.
*G10L 15/22* (2006.01)
*H04N 21/84* (2011.01)

(52) U.S. Cl.
USPC ............ 704/235; 704/236; 704/270; 386/241

(58) Field of Classification Search .................. 704/235, 704/236, 270, 278; 386/241
See application file for complete search history.

(56) References Cited

U.S. PATENT DOCUMENTS

| | | | | |
|---|---|---|---|---|
| 4,591,928 A * | 5/1986 | Bloom et al. | .................... | 360/13 |
| 5,828,809 A * | 10/1998 | Chang et al. | ................... | 386/241 |
| 6,173,287 B1 | 1/2001 | Eberman et al. | | |
| 6,311,194 B1 | 10/2001 | Sheth et al. | | |
| 6,616,700 B1 * | 9/2003 | Thum et al. | .................... | 715/273 |
| 6,754,373 B1 * | 6/2004 | de Cuetos et al. | ............ | 382/118 |
| 6,774,917 B1 | 8/2004 | Foote et al. | | |
| 6,833,865 B1 | 12/2004 | Fuller et al. | | |
| 7,013,273 B2 * | 3/2006 | Kahn | ............................ | 704/235 |

(Continued)

FOREIGN PATENT DOCUMENTS

| | | |
|---|---|---|
| EP | 1 073 272 | 1/2001 |
| WO | 02/080530 | 10/2002 |
| WO | 2004/042493 | 5/2004 |

OTHER PUBLICATIONS

International Search Report for PCT/GB2008/000443, mailed Aug. 5, 2008.

(Continued)

*Primary Examiner* — Martin Lerner
(74) *Attorney, Agent, or Firm* — Nixon & Vanderhye P.C.

(57) ABSTRACT

Video material is dividing into temporal segments. Each segment is examined to determine whether the soundtrack of the segment contains speech sufficient for analysis and if so, metadata are generated based on analysis of the speech. If not, the segment is analysed by comparing frames thereof with those of stored segments that already have metadata assigned to them. One then assigns to the segment under consideration stored metadata associated with one or more stored segments that are similar.

12 Claims, 2 Drawing Sheets

U.S. PATENT DOCUMENTS

| | | | |
|---|---|---|---|
| 2001/0018693 A1* | 8/2001 | Jain et al. | 707/500 |
| 2002/0069218 A1 | 6/2002 | Sull et al. | |
| 2002/0163532 A1* | 11/2002 | Thomas et al. | 345/723 |
| 2003/0007555 A1 | 1/2003 | Divakaran et al. | |
| 2003/0033347 A1 | 2/2003 | Bolle et al. | |
| 2003/0083871 A1* | 5/2003 | Foote et al. | 704/233 |
| 2003/0085997 A1* | 5/2003 | Takagi et al. | 348/143 |
| 2003/0112265 A1* | 6/2003 | Zhang | 345/723 |
| 2004/0205655 A1* | 10/2004 | Wu | 715/530 |
| 2005/0234958 A1 | 10/2005 | Sipusic et al. | |
| 2007/0091203 A1* | 4/2007 | Peker et al. | 348/415.1 |
| 2007/0118374 A1* | 5/2007 | Wise et al. | 704/235 |
| 2007/0201558 A1* | 8/2007 | Xu et al. | 375/240.22 |
| 2008/0021928 A1 | 1/2008 | Yagnik | |

OTHER PUBLICATIONS

Coden et al., "Speech Transcript Analysis for Automatic Search", Proceedings of the Annual Hawaii International Conference on System Sciences, Jan. 3, 2001, pp. 1-9, XP002310679.

Mohan, Institute of Electrical and Electronics Engineers:, "Video Sequence Matching", May 12, 1998, Proceedings of the 1998 IEEE International Conference on Acoustics, Speech and Signal Processing, New York, NY: IEEE, US, p. 3, XP000951261.

Bolle et al., "VeggieVision: a Produce Recognition System", Applications of Computer Vision, Dec. 2, 1996, WACV "96", Proceedings 3$^{rd}$ IEE Workshop on Sarasota, FL., USA, pp. 244-251, XP010206439.

Hang et al., "An Integrated System for Content-Based Video Retrieval and Browsing", Pattern Recognition, Elsevier, Kidlington, GB, vol. 30, No. 4, Apr. 1997, pp. 643-658, XP004059159.

Swain, Michael J. and Ballard, Dana H., "Color Indexing", International Journal of Computer Vision, 7:1, 11-32, 1991 Kluwer Academic Publishers, Netherlands (22 pgs.).

Zhang, Dengsheng and Lu, Guojun, "Segmentation of Moving Objects in Image Sequence: A Review", Gippsland School of Computing and Information Technology, Monash University, Churchill, Vic 3842, Australia, 2001, (29 pgs.).

Liu, Lijie, "Combined Key-Frame Extraction and Object-Based Video Segmentation" IEEE Transactions on Circuits and Systems for Video Technology, vol. 15, No. 7, Jul. 2005 (16 pgs.).

Kobla, Vikrant et al., "Developing High-Level Representations of Video Clips using Video Trails", Laboratory for Language and Media Processing, University of Maryland, College Park, MD and Department of Computer Science, University of Maryland, College Park, MD, 1997 (12 pgs.).

Hunter, Jane et al., "The Application of Metadata Standards to Video Indexing", paper retrieved from http://espace.library.uq.edu.au/eserv.php?pid=UQ:7837&dsID=final.html on Nov. 21, 2012 (23 pgs.).

Makhoul, John et al., "Speech and Language Technologies for Audio Indexing and Retrieval", Invited Paper, Proceedings of the IEEE, vol. 88, No. 8, Aug. 2000 (16 pgs.).

* cited by examiner

METHOD AND SYSTEM FOR ANNOTATING VIDEO MATERIAL

This application is the U.S. national phase of International Application No. PCT/GB2008/000443 filed 7 Feb. 2008, which designated the U.S. and claims priority to European Application No. 07250573.8, filed 13 Feb. 2007, the entire contents of each of which are hereby incorporated by reference.

SUMMARY

The present invention is concerned with the analysis of video material.

According to the present invention these is provided a method of processing video material, comprising dividing the material into temporal portions and for each temporal portion:

(i) determining whether the soundtrack of the portion contains speech sufficient for analysis;

(ii) if it has, generating metadata for that portion based on analysis of the speech;

(iii) if it has not, analysing the portion by comparing frames thereof with stored frames, and assigning to the portion stored metadata associated with one or more stored frames that are similar.

BRIEF DESCRIPTION OF THE DRAWINGS

Some embodiments of the invention will now be described, by way of example with reference to the accompanying drawings, in which.

DETAILED DESCRIPTION OF PRESENT EXAMPLE EMBODIMENTS

The apparatus now to be described serves for the classification of video material. It will be described in terms of analysis of a videogram—that is to say, a videotape, video cassette or video disc recording (e.g. DVD), typically of a movie or television programme. However it can also be applied to visual material on other media such as celluloid film, provided that it is scanned to convert it into a video signal.

Reference may also be made to segments, scenes and shots. As a preliminary, some explanation of these and other terms will be given. These are explanations rather than definitions because there are no universal agreed definitions for some of them. A videogram (or, colloquially, a "video") is a semantically meaningful sequence of video streams such as a complete movie or TV programme. A shot is an image sequence which presents continuous video frames for one action which appears to be from a single operation of the camera. In other words, it is the sequence of images that is generated by the camera from the time it begins recording images to the time it stops recording images. Scene is more difficult to define as it is often related to semantics of shots. Scene usually refers to a group of consecutive shots that are unified by location or dramatic incident. For example, we could see many consecutive shots (taken by different cameras) sharing the similar visual content because they are produced in the same environment such as a meeting room or a battlefield. Generally, a video scene is basically a story unit that shows the same objects and allows one event to be fully presented. Scene change detection is an operation that divides video data into physical shots. Video segment refers to one or more semantically related scenes. Broadly speaking, video segments have longer durations than video scenes. For example, two persons are building a shelter in an uninhabited island. One scene could show one person searching for tree branches; another scene might show the other person making some kinds of rope; and a third scene is showing they are setting up the shelter together. All these scenes could be considered as one video segment.

Key frames refer to frames which are essential to define a movement. In animation, key frames are drawings. They are called "frames" because their position in time is measured in frames on a strip of film. A sequence of key frames defines which movement the spectator will see, whereas the position of the key frames on the film (or video) defines the timing of the movement. Because only two or three key frames over the span of a second don't create the illusion of movement, the remaining frames are filled with more drawings, called "inbetweens". In video, a key frame is a frame used to indicate the beginning or end of a change made to the signal. For instance, a key frame could be set to indicate the point at which audio will have faded up or down to a certain level.

Figure 1:
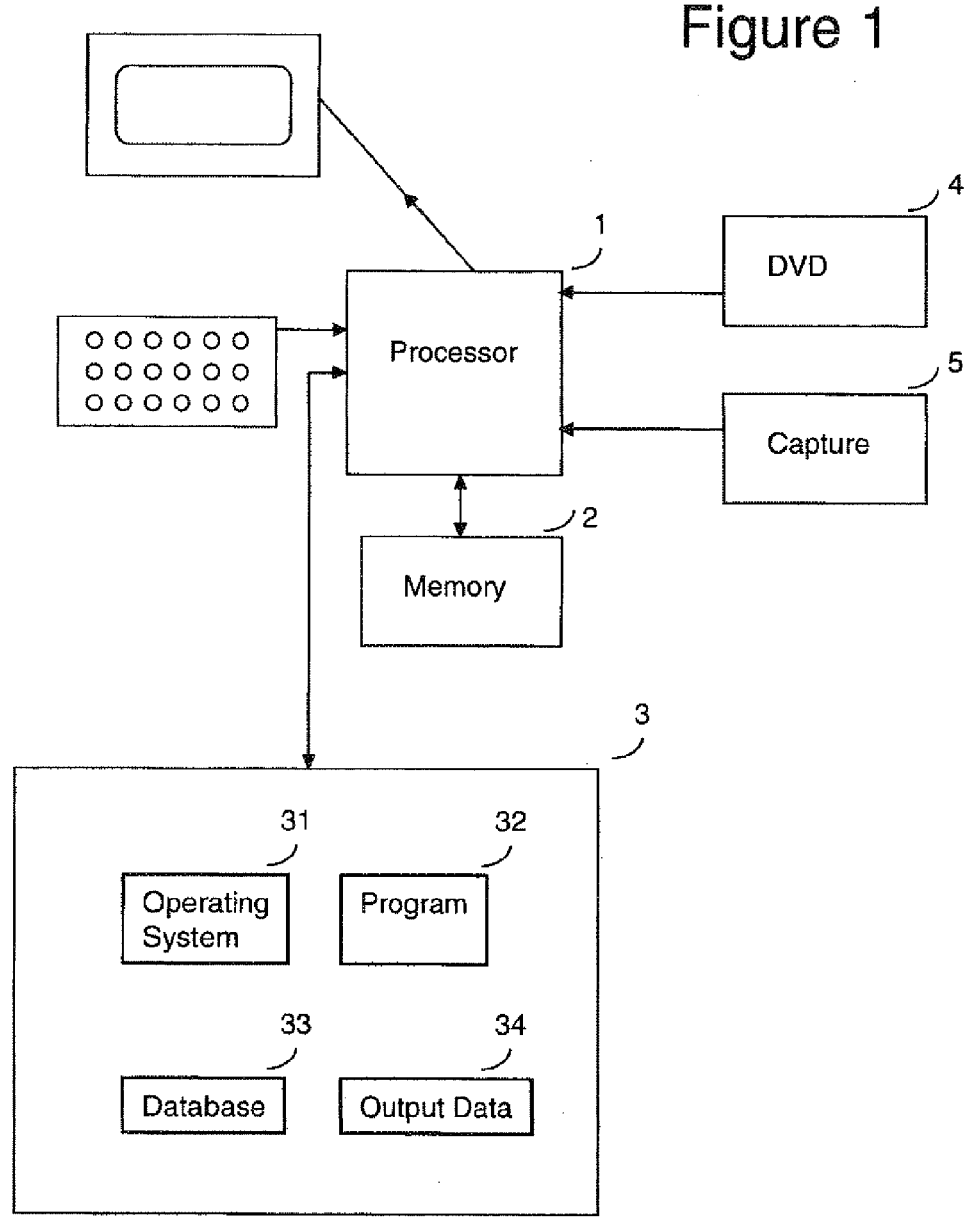
FIG. 1 is a block diagram of an apparatus for analysing video material.

FIG. 1 shows a suitable apparatus. A processor 1 has access to memory 2 and a disc store 3. Video input is provided via a DVD drive 4 or video capture card 5. Within the store 3 are (logically) storage areas as follows:

31—containing operating system software;

32—containing a program with instructions for performing the method shortly to be described;

33—containing a reference database of video segments with accompanying metadata;

34—for storage of data generated by the method.

Figure 2:
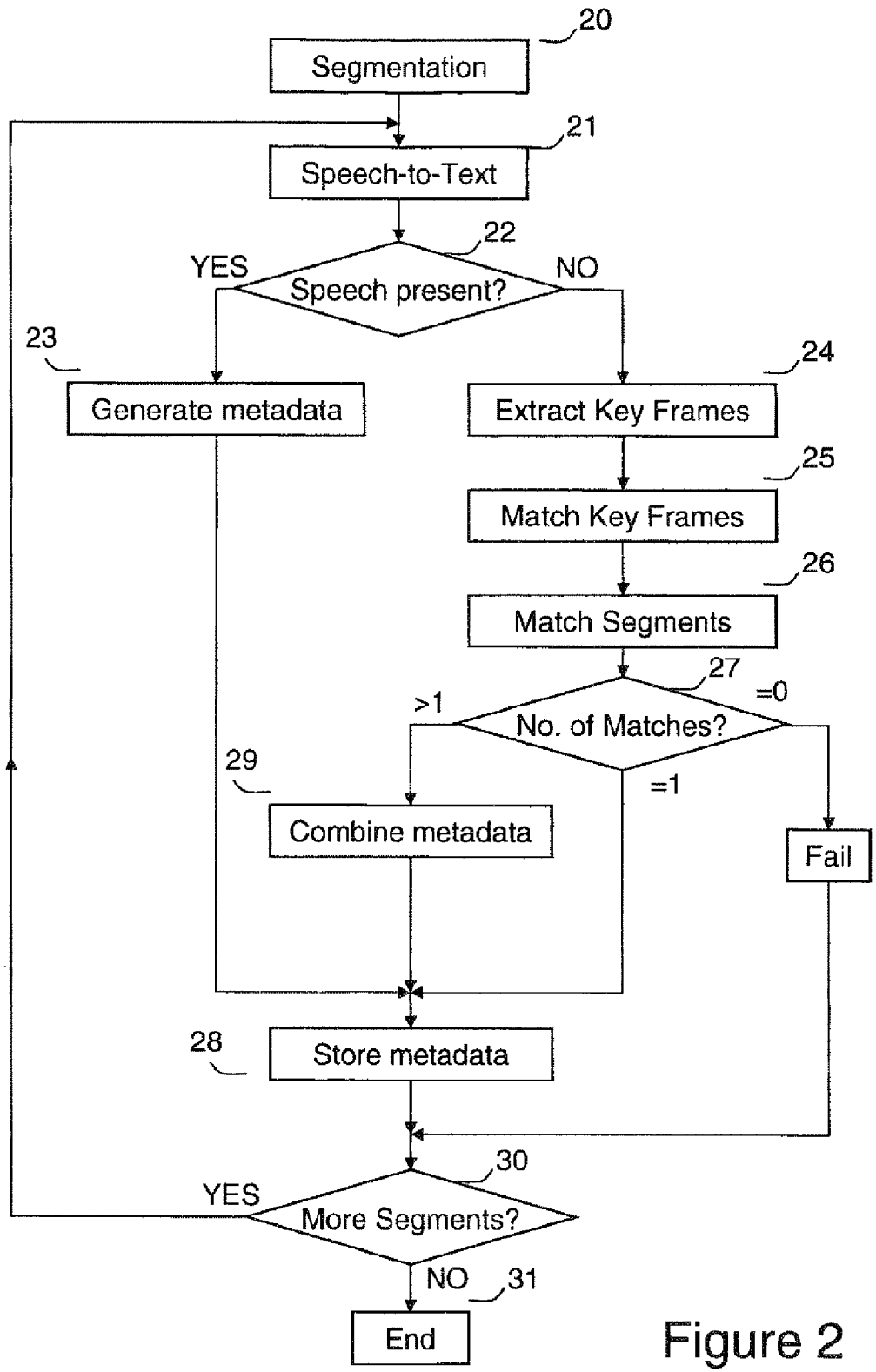
FIG. 2 is a flowchart detailing the operation of the apparatus.

The operation of the apparatus is shown in outline in the flowchart of FIG. 2.

Firstly, Step 20, the videogram is divided into segments, using a video segmentation algorithm. This can be performed using a known algorithm for shot, key frames and scene segmentations. These kinds of segmentation are often based on pixel features or differences between pixels in succeeding frames. Some segmentation algorithms are beginning to exploit object detections. One of these is described in Lijie Liu, Guoliang Fan: Combined Key-Frame Extraction and Object-Based Video Segmentation, IEEE Transactions on Circuits and Systems for video technology, Vol 12, No 7, July, 2005, pp 869-884. There is also a good review of video segmentation algorithms in D. S. Zhang and G. J. Lu: Segmentation of Moving Objects in Image Sequence: A Review; Journal of Circuits, Systems, and Signal Processing, Volume 20, Number 2/March, 2001, pp. 143-183.

In Step 21, each segment is examined by subjecting its accompanying sound track to a speech to text algorithm. This step can be performed using commercially available speech-to-text software such as Videologger from Virage Incorporation, Cambridge, UK. Then (22) the output of this analysis is tested. If there is text output, or text output meeting a set threshold, then the text is analysed at Step 23; if, on the other hand, there is no text, or no text meeting the threshold then the segment is considered to be silent and control passes to Step 24.

Step 23 comprises an analysis of the text to annotate, that is, to assign metadata to, the segment. The use of speech-to-text on a soundtrack in order to categorise audiovisual material is well known, and thus will not be described in detail. See, for example, U.S. Pat. No. 6,833,865 and US patent application 2001/0018693.

At Step 24, it has already been determined that the segment contains no speech of value for annotation purposes, so analysis of the picture content begins by identifying key frames in the segment. Tools for this purpose are commercially available. See, for example, Kobla, V., Doermann, D. and Faloutsos, C. Developing High-Level Representations of Video Clips using Video Trails, Proceedings of the SPIE Conference on Storage and Retrieval for Image and Video Databases VI, pages 81-92, 1998, which describes software called MERIT for key frame extraction. Details of the algorithms are given in the paper.

Alternatively, we can use the following algorithm to segment video and extract key frames. Each video frame is compared with its next video frame, then the similarity of video frames is calculated to determine whether there is a change in the scenery or not. The change can be measured by the differences between pixels or semantic changes such as new objects. Whether a difference is large enough to count as a change will depend on some pre-defined thresholds. If there is a change, this is considered to represent a cut. This way, the video is divided into shots. We take the first frame of each shot as the key frame.

The next step requires access to a database of already annotated, video segments which in this example, are stored in the assigned area 33 of the store 3. These are stored, along with their metadata (i.e. keywords or summary texts) which are either manually annotated or automatically generated from their associated audios through text-to-speech software. It is assumed that there is such a collection of such video segments in the store when we start to annotate video segments deemed to be silent. Segments newly processed at Step 23 may be added to this database if desired, though this is not mandatory. The key frames of the segments stored in the database are marked as such (or, alternatively, only the key frames are stored, the other frames being omitted. Thus at Step 25 the segment under consideration is to be matched to one or more segments in the database, on the basis of key frame similarity.

One of known technique that can be used for the frame similarity calculation is colour indexing. One example proceeds as follows:

First it converts the frames (if necessary) from the RGB colour model to HSV colour model. Then it quantizes the HSV colour axis for faster calculation and reduces the weighting of the luminance as follows: H: 16 colours, S: 16 colours, V: 8 colours. After that the colour is mapped from 3D into 1D to construct the colour histogram by counting the number of times each colour is present in the video frame. The colour histogram is then normalized such that its total area is equal to one. For each video frame, the colour histogram is constructed. The similarity of two video frames is then calculated by the intersection of the colour histograms. If we found that the intersection is larger then 0.7, we consider the two as similar.

A histogram-based image characterizes an image by its colour distribution in colour spaces. A colour space is defined as a model for representing colour in terms of intensity values. Typically, a colour space defines a one- to four-dimensional space. A colour component, or a colour channel, is one of the dimensions. The colour histogram intersection or distance was proposed for colour image retrieval in M. J. Swain and D. H. Ballard. "Color indexing", International Journal of Computer Vision, 7:1 1991. The intersection of histograms h and g is given by:

$$d(h, g) = \frac{\sum_A \sum_B \sum_C \min(h(a, b, c), g(h, b, c))}{\min(|h|, |g|)}$$

where |h| and |g| gives the magnitude of each histogram, which is equal to the number of samples, and where a, b and c represent the three colour channels (R,G,B or H,S,V) and A, B, C, indicate summation over all values of a, b, c respectively. Histogram search characterizes an image by its colour distribution, or histogram. However, images having similar colour distributions may not be semantically similar. But it gives good results most of the time.

Step 26: Here it is to be determined whether, on the basis of the key frame match or matches, a "silent" segment matches one of the segments in the database. If the silent segment has only one key frame and the a segment in the database has only one key frame then if the frames match then the segments also match. However, if the two segments have more than one key frame, and possibly also the two segments do not have the same number of key frames, then the situation becomes more complex. One example of an algorithm suitable for determining whether two segments match is the following:

Let $\{k_1, k_2, \ldots, k_n\}$ be the key frames of segment S1 (the "silent" segment) and $\{f_1, f_2, \ldots, f_m\}$ are the key frames of segment S2 (a segment in the database).

S1 matches S2 if the following formula is greater than say 0.7:

$$\sum_{i=1}^{n} \frac{In(k_i, S2)}{n}$$

where $In(k_i, S2)$ is 1 if $k_i$ matches any key frame of S2. Otherwise, it's 0.

At Step 27 it is checked how many segments in the database are found to match the segment being analysed:

0: no match is found, the segment cannot be annotated;

1: if only one segment from the database matches, then (Step 28) the metadata for this segment are copied from the database and added to the segment being analysed;

more than 1: in this case then two or more sets of metadata from the database need to be analysed to derive a single set for the current segment being analysed: control passes to Step 29.

Step 29: These metadata are analysed to produce the metadata for the segment that is being analysed. These metadata collections could have repeats, or could be merged (or specialised according to the ontology used). Thus the analysis of metadata is a cleaning process. The process is as follows:

29.1. Repeated keywords or key phrases are removed.

29.2. The set of keywords and/or key phrases from step 29.1 may be further pruned according to term density. That is, terms having similar meanings are clustered.

29.3. Specialisation: preferably the system uses an ontology to organise keywords and/or key phrases, a more specific ontology concept is associated with the segment. When the set of keywords and/or key phrases characterising the concept is a subset of the metadata derived from step 29.2. Each concept of the ontology is associated with or characterised by a set of keywords or phrases. If all these keywords or phrases of a concept are found in the keywords or phrases of the segment as obtained in 29.2, then this segment is associated with this concept.

Once the annotation of the segment is complete and the result stored (Step 28), then if (30) there are further segments as yet unprocessed the process is repeated from step 21. Otherwise the process terminates at Step 31.

If metadata are required for a whole video, then this is the set of metadata of all its segments, albeit with removal of any repetitions.

Once a segment, or, as he case may be, a videogram, has had metadata assigned to it, it can then, if desired, be indexed using conventional ontology-based classification techniques.

What is claimed is:

1. A method of assigning metadata to video material, comprising dividing the material into temporal portions of video frames and for each temporal portion:
   (i) determining, using a computer processing system comprising a computer processor, whether a soundtrack of the portion contains speech sufficient for analysis;
   (ii) if it has, generating metadata for that portion of video frames based on analysis of the speech and adding the portion, with the generated metadata, to a database of stored video frames;
   (iii) if it has not, analysing the portion by comparing the video frames thereof with already annotated video frames stored in the database, and assigning to the portion stored metadata associated with one or more stored video frames that are similar.

2. A method according to claim 1 in which the step of comparing video frames comprises extracting key frames from the portion under consideration and comparing the key frames with key frames of the stored portions.

3. A method according to claim 2 in which a portion under consideration is deemed similar to a stored portion if the proportion of video frames in the portion under consideration that meet a criterion of similarity with video frames of the stored portion exceeds a threshold.

4. A method according to claim 1, further comprising, in the event that the comparison step identifies a plurality of stored portions, retrieving stored metadata associated with each portion identified and combining said metadata, including eliminating duplicate or similar items, to produce a single set of metadata for the portion under consideration.

5. A method according to claim 1, wherein said comparing the video frames thereof with already annotated video frames stored in the database uses color indexing to determine similarity of the video frames.

6. A method according to claim 1, wherein the already annotated video frames used in the comparing of step (iii) became stored in the database as a result of previously performing steps (i) and (ii) for those video frames.

7. A system comprising:
   a computer processing system, comprising a computer processor, configured to:
      assign metadata to video material; and
      divide the material into temporal portions of video frames and for each temporal portion perform at least:
         (i) determine whether the soundtrack of the portion contains speech sufficient for analysis;
         (ii) if it has, generate metadata for that portion of video frames based on analysis of the speech and adding the portion, with the generated metadata, to a database of stored video frames; and
         (iii) if it has not, analyze the portion by comparing the video frames thereof with already annotated video frames stored in the database, and assign to the portion stored metadata associated with one or more stored video frames that are similar.

8. The system according to claim 7, wherein the computer processing system is further configured to compare video frames by extracting frames from the portion under consideration and comparing the frames with frames of the stored portions.

9. The system according to claim 8, wherein a portion under consideration is deemed similar to a stored portion if the proportion of video frames in the portion under consideration that meet a criterion of similarity with video frames of the stored portion exceeds a threshold.

10. The system according to claim 7, wherein the computer processing system is further configured to, in the event that the comparing identifies a plurality of stored portions, retrieve stored metadata associated with each portion identified and combine said metadata, including eliminating duplicate or similar items, to produce a single set of metadata for the portion under consideration.

11. The system according to claim 7, wherein said comparing the video frames thereof with already annotated video frames stored in the database uses color indexing to determine similarity of the video frames.

12. The system according to claim 7, wherein the already annotated video frames used in the comparing of (iii) became stored in the database as a result of previously performing (i) and (ii) for those video frames.

\* \* \* \* \*